(12) United States Patent
Zaitz et al.

(10) Patent No.: US 10,414,101 B2
(45) Date of Patent: Sep. 17, 2019

(54) APPARATUS AND METHOD FOR AN INFRARED PRESSURE WELD RESERVOIR

(71) Applicant: Continental Automotive Systems, Inc., Auburn Hills, MI (US)

(72) Inventors: Michael J Zaitz, Royal Oak, MI (US); Shawn Griffin, Holly, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 289 days.

(21) Appl. No.: 14/878,782

(22) Filed: Oct. 8, 2015

(65) Prior Publication Data

US 2016/0101563 A1 Apr. 14, 2016

Related U.S. Application Data

(60) Provisional application No. 62/062,320, filed on Oct. 10, 2014.

(51) Int. Cl.
| | | |
|---|---|---|
| *B29C 65/14* | (2006.01) | |
| *B29C 65/00* | (2006.01) | |
| *B60S 1/50* | (2006.01) | |
| *B65D 6/00* | (2006.01) | |
| *B29L 31/00* | (2006.01) | |
| *B29C 65/78* | (2006.01) | |

(52) U.S. Cl.
CPC ...... *B29C 65/1412* (2013.01); *B29C 65/1467* (2013.01); *B29C 66/1222* (2013.01); *B29C 66/1224* (2013.01); *B29C 66/131* (2013.01); *B29C 66/54* (2013.01); *B29C 66/632* (2013.01); *B60S 1/50* (2013.01); *B65D 11/20* (2013.01); *B29C 65/7841* (2013.01); *B29L 2031/712* (2013.01)

(58) Field of Classification Search
CPC ............ B29C 65/1412; B29C 65/1416; B29C 65/1419; B29C 65/1422; B65D 11/10; B60K 15/03; B23K 26/244
USPC ........................................................ 220/562
See application file for complete search history.

(56) References Cited

U.S. PATENT DOCUMENTS

| | | | | |
|---|---|---|---|---|
| 5,626,776 A | * | 5/1997 | Morris, Jr. ............. | B60K 15/03 219/121.63 |
| 6,877,627 B2 | * | 4/2005 | Brandner ............ | B29C 65/1435 220/4.13 |
| 7,427,000 B2 | * | 9/2008 | Austerhoff ....... | B60K 15/03006 220/4.14 |
| 9,415,681 B2 | * | 8/2016 | Sun ................... | B29C 45/14467 |
| 2015/0258887 A1 | | 9/2015 | Sun et al. | |

FOREIGN PATENT DOCUMENTS

| | | |
|---|---|---|
| JP | 5828317 A | 2/1983 |
| JP | S5828317 A | 2/1983 |
| JP | 2002538038 A | 11/2002 |
| JP | 3776185 A | 5/2006 |

OTHER PUBLICATIONS

European Patent Office Search Report 15189325.2 dated May 2, 2016.

* cited by examiner

*Primary Examiner* — Jeffrey R Allen

(57) ABSTRACT

A fluid reservoir for a vehicle comprises a first reservoir portion and a second reservoir portion, wherein the first and the second reservoir portions define a reservoir to retain fluid for a washer system. The first reservoir portion and the second reservoir portion are secured together using infrared welding.

7 Claims, 6 Drawing Sheets

APPARATUS AND METHOD FOR AN INFRARED PRESSURE WELD RESERVOIR

CROSS REFERENCE TO RELATED APPLICATION

This application claims priority to U.S. Provisional Application No. 62/062,320 filed on Oct. 10, 2014.

TECHNICAL FIELD

The present disclosure relates to fluid reservoirs and more particularly to fluid reservoirs for automotive vehicle washer systems.

BACKGROUND

Vehicle washer systems require reservoirs to retain the fluid until needed. The required fluid reservoir size is increasing as more features on vehicles need washing, e.g. rear windows, headlights, etc. However, vehicle packaging space is limited for such reservoirs. Typically, washer reservoirs are injection molded using thin wall or light weight structure. The washer reservoirs then have to be welded. The current welding approach is a weld flange at 90 degree (perpendicular to reservoir walls). This creates a limited weld surface area and requires a minimum proximity to other components with high thermal conditions, which takes up limited packaging space within a vehicle. However, a direct fracture point at the internal weld is created that can be breached during freeze conditions, vibration testing, and from thermal shock.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A fluid reservoir for a vehicle comprises a first reservoir portion and a second reservoir portion, wherein the first and the second reservoir portions define a reservoir to retain fluid for a washer system. An overlapping portion of the first reservoir portion and the second reservoir portion is formed between them when the portions are secured together. The overlapping portion is a weld formed using an infrared weld apparatus.

A method of infrared welding a fluid reservoir for a vehicle comprises placing a first reservoir portion inside a first cavity defined by a first weld portion and a second reservoir portion inside a second cavity defined by a second weld portion. A first light array concentrically surrounds the first reservoir portion and a second light array is concentrically inside the second reservoir portion. The first weld position and the second weld portion are heated using the first and second light array. Then the light arrays are moved away and the first weld portion and the second weld portion are moved together until an overlapping portion is formed by the first reservoir portion and the second reservoir portion. A pair of slides are placed to concentrically surround the overlapping portion and pressurized air is applied to the reservoir to force the overlapping portion against the slides to secure the first reservoir portion and the second reservoir portion together at the weld.

An infrared weld apparatus for a fluid reservoir comprises a first weld portion defining a first weld cavity to receive a first reservoir portion and a second weld portion defining a second weld cavity to receive a second reservoir portion. A pair of slides concentrically surround an overlapping portion of the first reservoir portion and the second reservoir portion, when the first reservoir portion, first weld portion, second reservoir portion and second weld portion are assembled together. A first light array is located concentrically surrounding the overlapping portion and assembled inside the pair of slides and a second light array located concentrically inside the overlapping portion, parallel to the first light array. The first light array and second light array are configured to apply heat at the overlapping portion to weld the first reservoir portion to the second reservoir portion.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
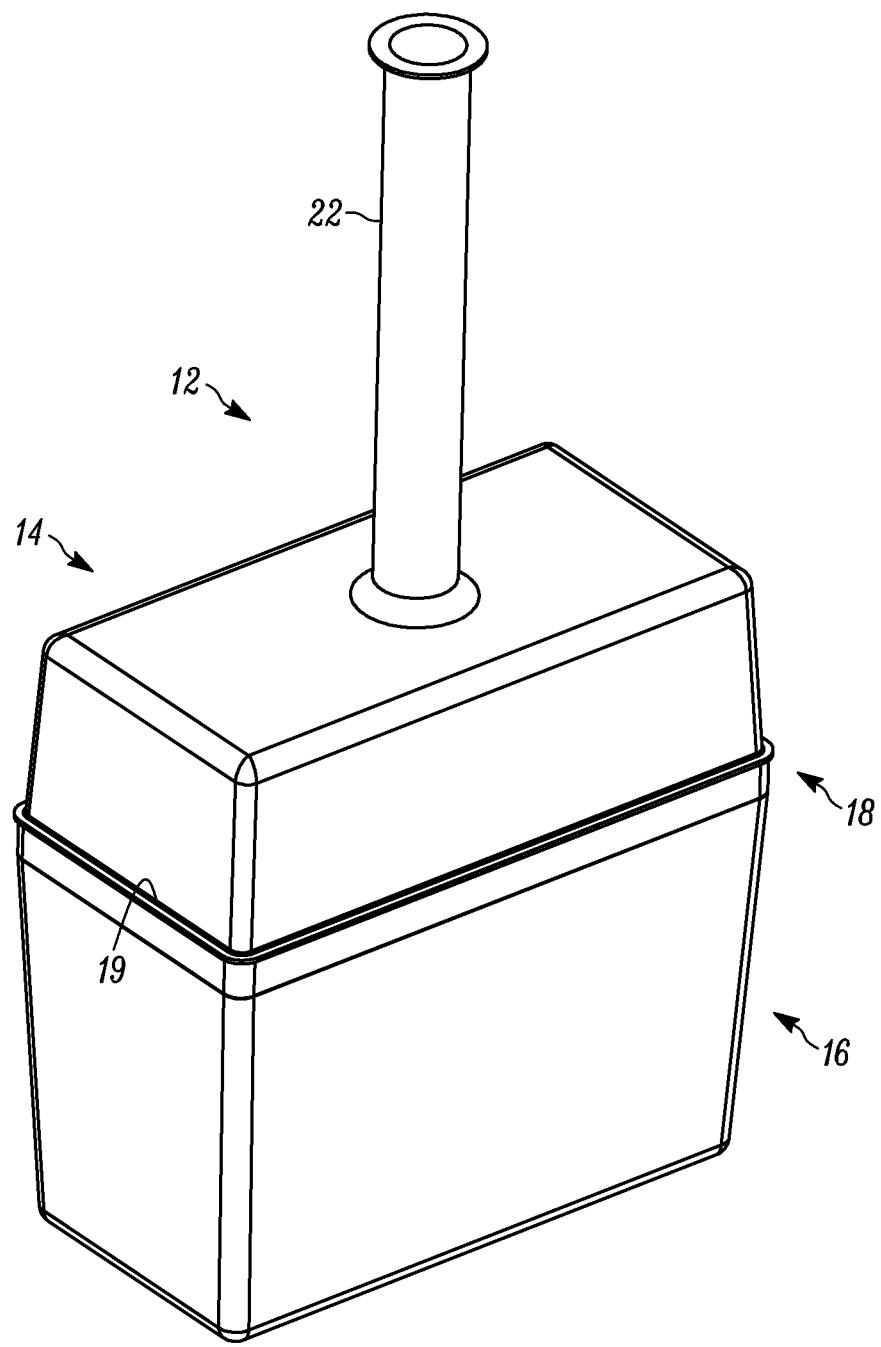
FIG. 1 is a schematic illustrations of a washer reservoir for a vehicle formed using an infrared pressure weld method.
Figure 2:
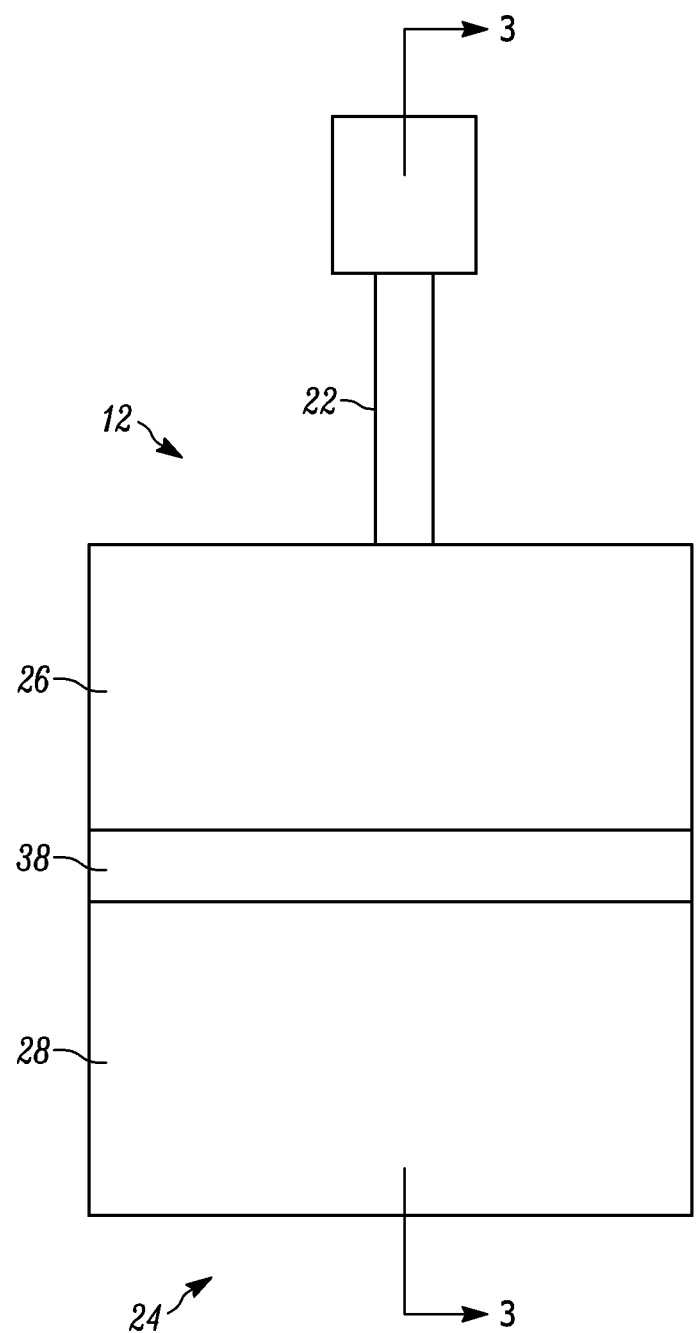
FIG. 2 is an enlarged schematic illustration of a front view of the washer reservoir and welding components showing section line 3-3.
Figure 3:
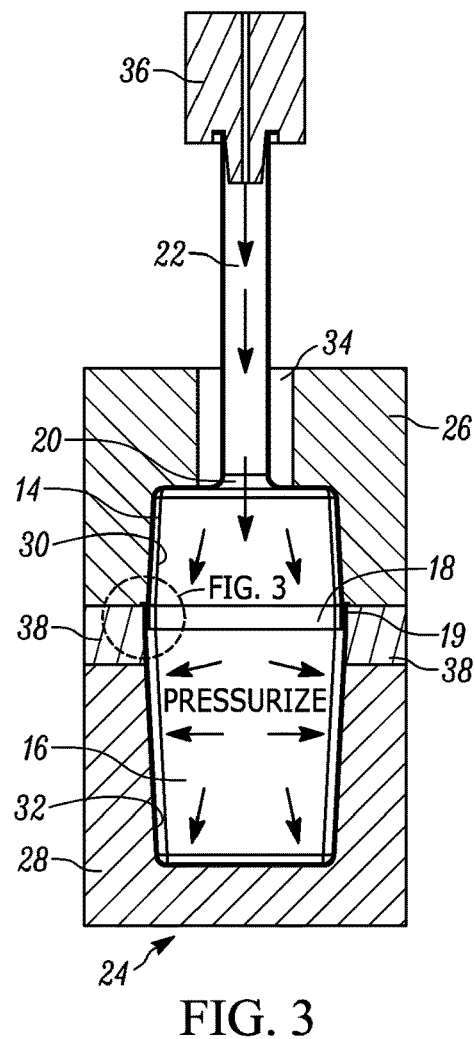
FIG. 3 is an enlarged schematic illustration of a cross-sectional view of the washer reservoir and welding components along the section line 3-3 of FIG. 2.
Figure 3A:
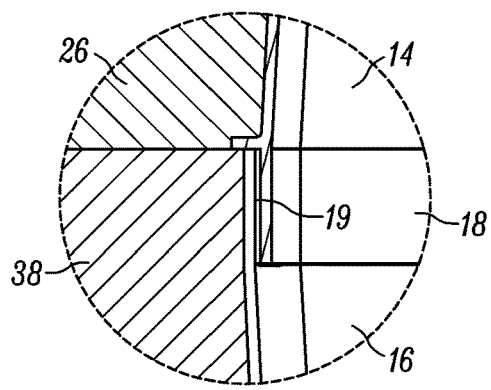
FIG. 3A is an enlarged schematic illustration of a cross-sectional view of a section X the washer reservoir and welding components illustrating a weld zone.
Figure 4:
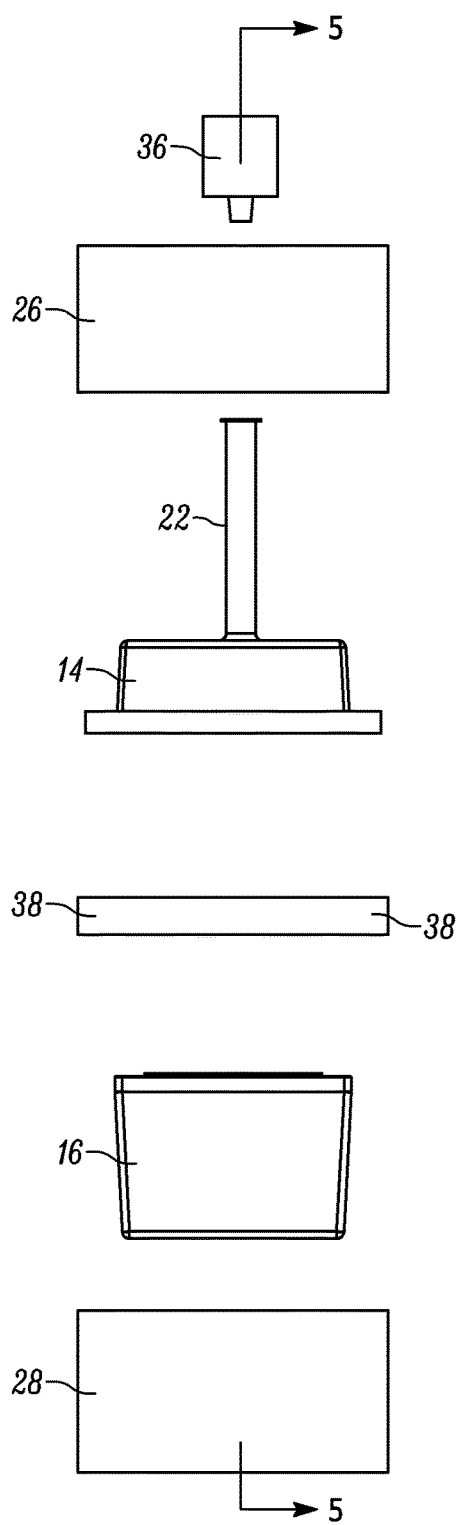
FIG. 4 is an exploded schematic front view illustration of the washer reservoir and welding components of FIGS. 2-3 showing section line 5-5.
Figure 5:
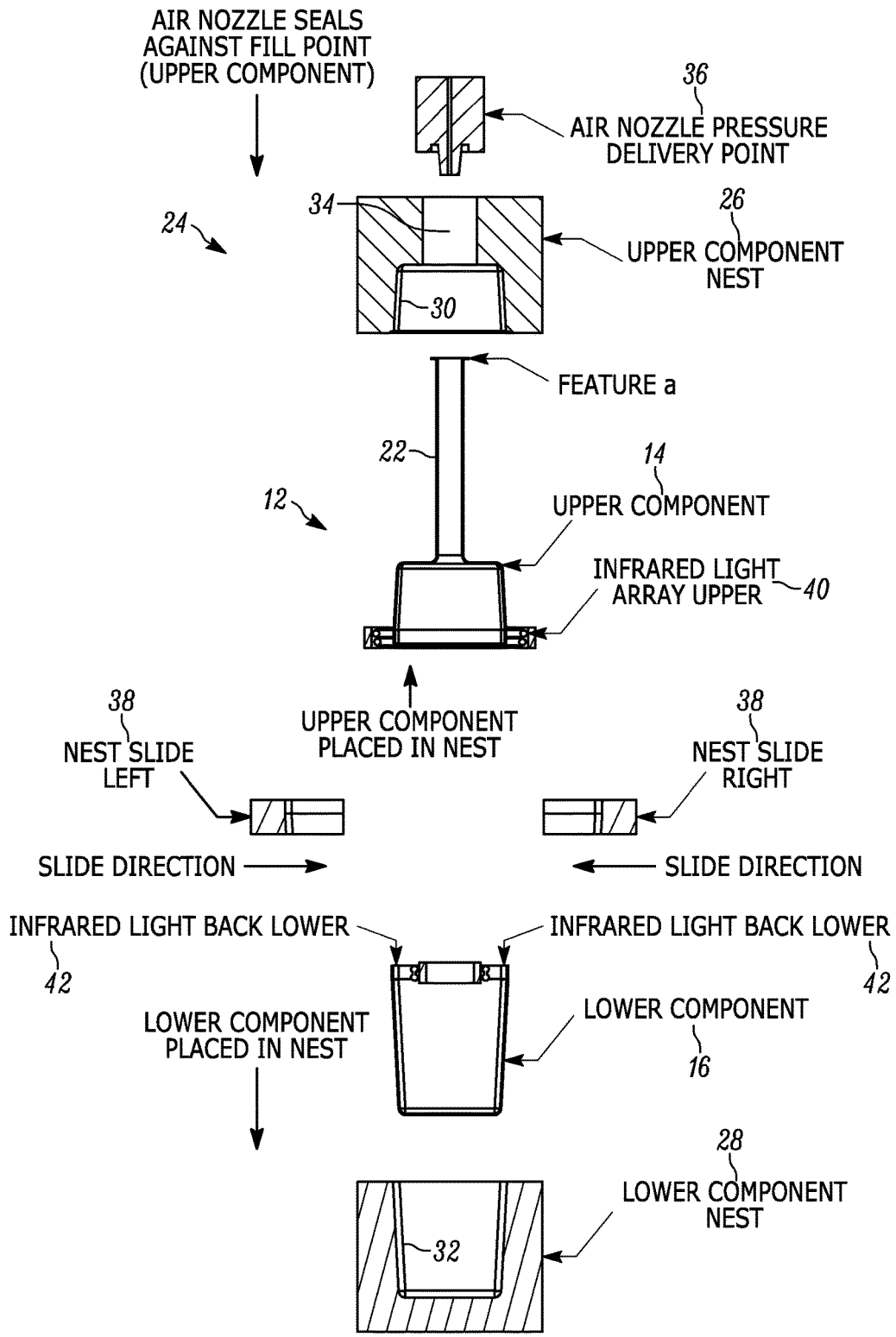
FIG. 5 is an enlarged schematic illustration of a cross-sectional view of the washer reservoir and welding components along the section line 5-5 of FIG. 4.
Figure 6:
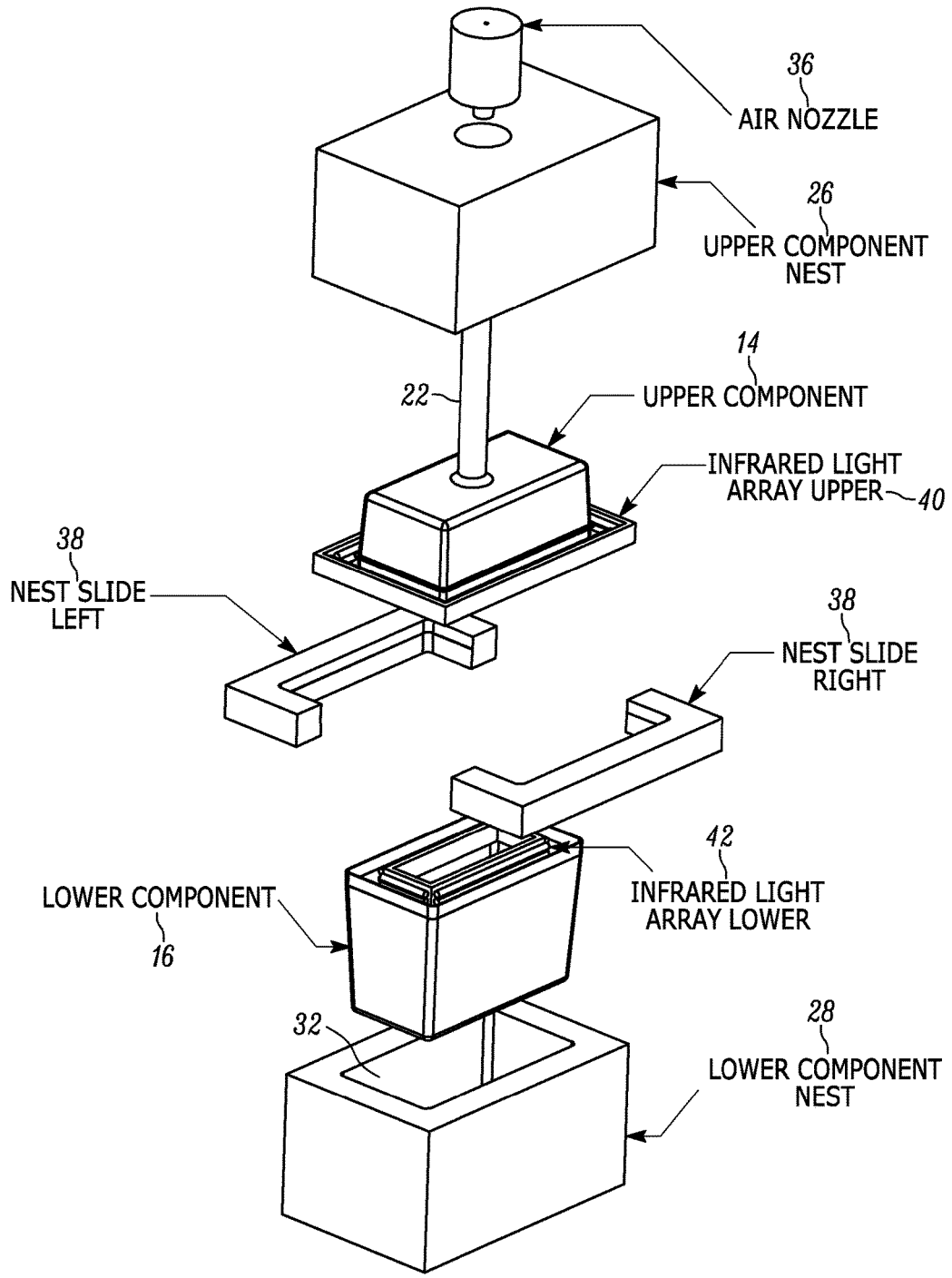
FIG. 6 is an enlarged schematic perspective illustration of the washer reservoir and welding components of FIGS. 4-5.

The following description is merely exemplary in nature and is in no way intended to limit the disclosure, its application, or uses. For purposes of clarity, the same reference numbers will be used in the drawings to identify similar elements. FIGS. 1-6 illustrate a washer reservoir 12 for a vehicle. The reservoir 12 is intended for use in a washer system for a vehicle. However, the reservoir 12 can also be used for other types of applications. The washer reservoir 12 is formed by injection molding to for a first reservoir portion 14 and a second reservoir portion 16. The first reservoir portion 14 and the second reservoir portion 16 are partially nested together with an overlapping portion 18. The first reservoir portion 14 may define a fluid inlet 20. A fluid passage 22 may connect to the fluid inlet 20. The fluid inlet 20 and fluid passage 22 may be used when the washer reservoir is in the vehicle to add fluid into the reservoir 12.

During the welding process the fluid inlet 20 and fluid passage 22 can be used to introduce pressurized air into the reservoir 12 as explained in further detail below.

Referring to FIGS. 1-6 the washer reservoir 12 is shown with a welding apparatus 24. The welding apparatus 24 has a first weld portion 26 and a second weld portion 28. The first weld portion 26 defines a first cavity 30 corresponding to the shape of the first reservoir portion 14. The second weld portion 28 defines a second cavity 32 corresponding to the shape of the second reservoir portion 26. During the weld process the first reservoir portion 14 and the second reservoir portion 16 are nested in the first weld portion 26 and second weld portion 28.

An aperture 34 in the first weld portion 26 accommodates the fluid inlet 20, allowing air to pass through the fluid inlet 20 and fluid passage 22 into the washer reservoir 12. An air nozzle 36 for the weld apparatus 24 can apply pressurized air into the washer reservoir 12. The pressurized air forces the first reservoir portion 14 and the second reservoir portion 16 outward again the first weld portion 26 and the second weld portion 28 to hold the reservoir 14, 16 during the weld process. The air nozzle 36 can be configured to match an opening into the air passage 22.

Additional fluid inlets 20 may be used to allow pressurized air into the washer reservoir. For example, an aperture in the second portion 16, which is used to allow fluid to exit the reservoir 12 to the washer system during use in the vehicle, may also be use to allow pressurized air into the washer reservoir 12 during the weld process. Other apertures may also be use to provide pressurized air during the weld process and then sealed or used for other purposes. Once skilled in the art would be able to determine the desired number of inlets 20 to provide pressurized air during the weld process based upon the shape, size, and process for a particular washer reservoir 12 and weld apparatus 24.

The welding apparatus 24 also includes a pair of slides 38 which fit over the washer reservoir 12 at positions that correspond to the overlapping portion 18. Once the first reservoir portion 14 an first weld portion 26 are positioned together with the second reservoir portion 16 and the second weld portion 28 the overlapping portion 18 is formed. The overlapping portion 18 is the targeted weld zone.

During the weld process a first infrared light array 40 is placed to surround the first reservoir portion 14 corresponding to what will be the overlapping portion 18 of the first weld portion 26. A second infrared light array 42 is placed within the second reservoir portion 16 and also corresponds to the location of the overlapping portion 18 of the second weld portion 28. Infrared light is applied by the first infrared light array 40 and the second infrared light array 42 to weld the first reservoir portion 14 to the second reservoir portion 16 at the overlapping area 18. The light array directs the heat to the desired specific weld zone(s).

The first and the second light arrays 40 and 42 are heated until the areas which will form the overlapping portion 18 have reached a sufficient predetermined temperature. If necessary the first and the second light arrays 40 and 42 are then moved out of the way and the first weld portion 26 and the second weld portion 28 are moved together to form the overlapping portion 18. The second light array 42 is located inside the second reservoir portion 16 and will likely need to be moved out of the way in order for the first reservoir portion 14 and the second reservoir portion to be assembled together. Likewise, the second light array 40 will likely need to be moved out of the way in order for the slides 38 to surround the overlapping portion 18.

From the outside, once assembled the pair of slides 38, are moved into position to surround the overlapping portion 18. The washer reservoir 12 is filled with pressurized air, which forces the overlapping portion 18 outward against the slides 38.

Using internal pressure and the moving nests 26, 28 the welding can occur in a manner that is not typical possible using infrared or hot plate welding. This process requires both sides of the weld, i.e. upper portion 14 and lower portion 16 at the overlapping area 18, to be pressed together and held using the nests 26, 28 on both sides and pressurized air within. A perpendicular weld flange, i.e. first and second light arrays 40, 42, is used to provide access for the needed pressure. Placing the weld surface 18 in the manner proposed removes the fracture point, increases weld surface area creating a stronger weld, and allows greater flexibility to respond to thermal and dynamic conditions acting on the reservoir 12 when it is assembled in the vehicle.

Therefore, referring to FIGS. 1-6, a fluid reservoir 12 for a vehicle comprises a first reservoir portion 14 and a second reservoir portion 16, wherein the first and the second reservoir portions 14, 16 define a reservoir 12 to retain fluid for a washer system. An overlapping portion 18 of the first reservoir portion 14 and the second reservoir portion 16 is formed between them when the portions 14, 16 are secured together. The overlapping portion is a weld 19 formed using an infrared weld apparatus 24.

The infrared weld apparatus 24 comprises a first nest 26 defining a first weld cavity 30 to receive the first reservoir portion 14 and a second nest 28 defining a second weld cavity 32 to receive the second reservoir portion 16. A first light array 40 is located concentrically surrounding the first reservoir portion 14 at the location that will become the overlapping portion 18 and a second light array 42 is located concentrically inside the second reservoir portion 16 at the location that will become the overlapping portion 18, and parallel to the first light array 40.

The first and the second light arrays 40 and 42 are heated using infrared heat, until the areas which will form the overlapping portion 18 have reached a sufficient predetermined temperature. The first and the second light arrays 40 and 42 are then moved out of the way and the first nest 26 and the second nest 28 are moved together to form the overlapping portion 18.

A pair of slides 38 are moved in place to concentrically surround the overlapping portion 18 when the first reservoir portion 14, first weld portion 26, second reservoir portion 16 and second weld portion 28 are assembled together. Pressurized air is pumped into the fluid reservoir 12 after the first reservoir portion 14, first weld portion 26, second reservoir portion 16, second weld portion 28, and the slides 38 are assembled together. The first reservoir portion 14 defines a fluid inlet 29 to receive the pressurized air when the fluid reservoir 12 is assembled in the weld apparatus 24 and to receive washer fluid when the fluid reservoir 12 is assembled in the vehicle.

A method of infrared welding a fluid reservoir 12 for a vehicle comprises placing a first reservoir portion 14 inside a first cavity 30 defined by a first weld portion 26 and a second reservoir portion 16 inside a second cavity 32 defined by a second weld portion 28. A first light array 40 concentrically surrounds the first reservoir portion 14 and a second light array 42 is concentrically inside the second reservoir portion 16. The first light array 40 and the second light array 42 apply infrared heat to the first reservoir portion 14 and the second reservoir portion 16.

The first light array 40 and the second light array 42 are moved out of the way. The first weld portion 26 and the second weld portion 28 are moved together until an overlapping portion 18 formed is formed by the first reservoir portion 14 and the second reservoir portion 16. A pair of slides 38 are placed to concentrically surround the overlapping portion 18 and the reservoir 12 is filled with pressurized air to weld the first reservoir portion 16 to the second reservoir portion 18, forming the weld 19, wherein the first reservoir portion defines a fluid inlet to receive washer fluid when the fluid reservoir is assembled in the vehicle.

The infrared weld apparatus 24 for welding a fluid reservoir 12 comprises a first weld portion 26 defining a first weld cavity 30 to receive a first reservoir portion 14 and a second weld portion 28 defining a second weld cavity 32 to receive a second reservoir portion 16. A first light array 40 is located concentrically surrounding the overlapping portion 18 of the first reservoir portion 14 and a second light array 42 is located concentrically inside the overlapping portion 18 of the second reservoir portion 16, parallel to the first light array 40. The first light array 40 and second light array 42 are configured to apply heat at the overlapping portion 18. A pair of slides 38 concentrically surround an overlapping portion 18 of the first reservoir portion 14 and the second reservoir portion 16, when the first reservoir portion 14, first weld portion 26, second reservoir portion 16 and second weld portion 28 are assembled together.

Pressurized air is pumped into the fluid reservoir 12 after the first reservoir portion 14, first weld portion 26, second reservoir portion 16, second weld portion 28, and the slides 38 are assembled together.

The first reservoir portion 14 also defines a fluid inlet 29 to receive the pressurized air when the fluid reservoir 12 is assembled in the weld apparatus 24 and to receive washer fluid when the fluid reservoir 12 is assembled in the vehicle.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A fluid reservoir for a washer system comprising:
a first reservoir portion; a second reservoir portion, wherein the first and the second reservoir portions define a reservoir to retain fluid for a washer system; and
an overlapping portion of the first reservoir portion and the second reservoir portion, wherein the first reservoir portion is nested within the second reservoir portion within the overlapping portion and a weld is formed within the overlapping portion between the first reservoir portion and the second reservoir portion using an infrared weld, wherein each of the first reservoir portion and the second reservoir portion include side walls that are disposed parallel to each other within the overlapping portion and the first reservoir portion includes a flange extending from an exterior surface of a corresponding one of the side walls for setting a length of overlap between the side walls within the overlapping portion and the infrared weld is between the exterior surface of the first reservoir portion and an interior surface of the second reservoir portion within the overlapping portion.

2. The fluid reservoir of claim 1, wherein the first reservoir portion is nested within the second reservoir portion such that when pressurized air is pumped into the fluid reservoir after the first reservoir portion, is nested within the second reservoir portion prior to formation of the weld, the first reservoir portion is pushed radially outward against the second reservoir portion within the overlapping portion.

3. The fluid reservoir of claim 2, wherein the first reservoir portion defines a fluid inlet to receive the pressurized air to push the first reservoir portion radially outward against the second reservoir portion prior to formation of the weld.

4. The fluid reservoir of claim 1, wherein the first reservoir portion defines a fluid inlet to receive washer fluid when the fluid reservoir is assembled in a vehicle.

5. The fluid reservoir of claim 1, wherein the side walls are disposed parallel to each other within the overlapping region and outside of the overlapping region.

6. The fluid reservoir of claim 1, wherein the side walls of both the first reservoir portion and the second reservoir portion within the overlapping portion and outside of the overlapping portion extend in a common direction.

7. The fluid reservoir of claim 1, wherein the flange extends perpendicular from the exterior surface of the corresponding side wall outside of the overlapping portion.

* * * * *